United States Patent
Shannon

(10) Patent No.: US 11,691,270 B2
(45) Date of Patent: Jul. 4, 2023

(54) MECHANISM WITH THREE DEGREES-OF-FREEDOM (DOF) OUTPUT TO PROVIDE INDEPENDENT CONTROL OVER ROLL, PITCH, AND YAW OF OUTPUT STRUCTURE

(71) Applicant: SANCTUARY COGNITIVE SYSTEMS CORPORATION, Vancouver (CA)

(72) Inventor: Connor Richard Shannon, Vancouver (CA)

(73) Assignee: Sanctuary Cognitive Systems Corporation, Vancouver (CA)

(*) Notice: Subject to any disclaimer, the term of this patent is extended or adjusted under 35 U.S.C. 154(b) by 278 days.

(21) Appl. No.: 16/940,566

(22) Filed: Jul. 28, 2020

(65) Prior Publication Data
US 2021/0031383 A1    Feb. 4, 2021

Related U.S. Application Data

(60) Provisional application No. 62/880,783, filed on Jul. 31, 2019.

(51) Int. Cl.
| | | |
|---|---|---|
| B25J 9/10 | (2006.01) | |
| B25J 17/02 | (2006.01) | |
| F16H 1/28 | (2006.01) | |
| F16H 1/46 | (2006.01) | |
| F16H 37/04 | (2006.01) | |

(52) U.S. Cl.
CPC .......... B25J 9/102 (2013.01); B25J 17/0283 (2013.01); F16H 1/2854 (2013.01); F16H 1/46 (2013.01); F16H 2037/048 (2013.01)

(58) Field of Classification Search
CPC .. B25J 9/102; B25J 17/0283; F16H 2037/048
See application file for complete search history.

(56) References Cited

U.S. PATENT DOCUMENTS

| | | | | |
|---|---|---|---|---|
| 4,636,138 A | * | 1/1987 | Gorman | B25J 19/002 414/735 |
| 10,502,297 B2 | * | 12/2019 | Lee | F16H 37/04 |
| 11,059,189 B2 | * | 7/2021 | Osawa | B25J 18/04 |

FOREIGN PATENT DOCUMENTS

| | | | |
|---|---|---|---|
| DE | 3736355 A1 | * | 5/1988 |
| EP | 0443576 B1 | * | 5/1994 |

* cited by examiner

*Primary Examiner* — Erin D Bishop
(74) *Attorney, Agent, or Firm* — Thomas Mahon; Adenike Adebiyi

(57) ABSTRACT

Mechanisms or apparatus convert a number of inputs via a number of input members into a number of output movements of an output structure, providing control in three degrees-of-freedom (DOF), for example control over roll, pitch and yaw of the output structure. Inputs may be rotations about a common axis of rotation, for example via a first ring, a second ring, and one or more plates, concentrically array. Rotation of the first ring may control a first DOF, rotation of the first ring may control a second DOF, and rotation of the plate may control all three DOF. Three concentrically arrayed tubular shafts may be employed, providing a through-passage or cable fluid conduit run to accommodate wires, optical fibers, fluid carrying conduits. Such may be particularly advantageous when employed as part of a robot, or other device with a tool or sensor or transducer located at or proximate a distal end thereof.

12 Claims, 11 Drawing Sheets

MECHANISM WITH THREE DEGREES-OF-FREEDOM (DOF) OUTPUT TO PROVIDE INDEPENDENT CONTROL OVER ROLL, PITCH, AND YAW OF OUTPUT STRUCTURE

TECHNICAL FIELD

This disclosure generally relates to mechanisms or apparatus the convert input motions into output motions, useful for example in robotics, for instance as part of a robotic appendage.

BACKGROUND

Description of the Related Art

Various mechanisms or apparatus exist for converting input motions into output motions. For example, four bar linkages employing four bars connected by pin joints provide a simple mechanism to convert one motion into another motion, e.g., converting translation along one axis to translation along a different axis; converting translation into rotation.

Such mechanisms or apparatus can be used in a large variety of practical applications. For example, robots with moveable appendages are becoming increasingly common. Such robotic appendages typically comprise a number of segments coupled by one or more joints, along with one or more actuators (e.g., electric motors, solenoids, hydraulic pistons/cylinders, or pneumatic pistons/cylinder), and an end effector or end-of-arm tool typically located at a distal end of the robotic appendage. Robust robotic appendages with a wide range of motion is typically desirable.

BRIEF SUMMARY

Mechanisms or apparatus are described herein which convert a number of inputs via a number of input members into a number of output movements of an output structure. As generally described, the inputs may be rotations about a common axis of rotation, for example via a first ring, a second ring, and one or more plates, and the outputs may include control in three degrees-of-freedom, for example control over roll, pitch and yaw of an output structure. The mechanisms or apparatus may advantageously employ three concentrically arrayed tubular shafts, which provide a through-passage or channel through the mechanism or apparatus, providing a cable fluid conduit run to accommodate wires, optical fibers, fluid carrying conduits passing between a proximate end and a distal end of the mechanism or apparatus. Such may be particularly advantageous when employed as part of a robot, or other device with a tool or sensor or transducer located at or proximate a distal end thereof.

An apparatus that provides three degrees-of-freedom (DOF) movement, may be summarized as comprising: a first input member; a second input member; a third input member; a first tubular shaft, the first tubular shaft rotatable about a first axis; a second tubular, the second tubular shaft rotatable about the first axis in response to rotation of the second input member about the first axis; a third tubular shaft, the third tubular shaft rotatable about the first axis in response to rotation of the third input member about the first axis; a first output member having a first longitudinal axis about which the first output member is rotatable; a second output member having a pivot axis about which the second output member is pivotable, the pivot axis perpendicular to the first longitudinal axis; a third output member, having a second longitudinal axis about which the third output member is rotatable, the first output member rotatably coupled to the second output member and the second output member coupled to rotate with the third output member; a plurality of gears, at least two of the gears of the plurality of gears drivingly couple the first tubular shaft to rotate about the first axis in response to rotation of the first input member, at least two of the gears of the plurality of gears drivingly couple the second tubular shaft to rotate about the first axis in response to rotation of the second input member, and at least two of the gears of the plurality of gears drivingly couple the first, the second and the third tubular shaft to rotate about the first axis in response to rotation of the third input member, wherein the first, the second and the third input members are operable to have a combined movement in three DOF.

The first tubular shaft, the second tubular shaft and the third tubular shaft may each include a respective through passage, and the first tubular shaft, the second tubular shaft and the third tubular shaft concentrically aligned with one another. At least a portion of the first tubular shaft may be concentrically rotatably mounted in at least a portion of the through passage of the second tubular shaft, and at least a portion of the second tubular shaft is concentrically rotatably mounted in at least a portion of the through passage of the third tubular shaft. In at least some implementations, the through passage of the third tubular shaft provides a cable fluid conduit run therethrough.

The plurality of gears may comprise: a first gear assembly comprising a first ring gear, a first sun gear, and a first plurality of planetary gears that drivingly couple the first ring gear to the first sun gear, the first sun gear fixed to the first tubular shaft; a second gear assembly comprising a second ring gear, a second sun gear, and a second plurality of planetary gears that drivingly couple the second ring gear to the second sun gear, the second sun gear fixed to the second tubular shaft; and a third gear assembly comprising a third ring gear, a third sun gear and a third plurality of planetary gears, that drivingly couple the third ring gear to the third sun gear, the third sun gear fixed to the third tubular shaft.

The first input member may be a first ring, the second input member may be a second ring, and the third input member may be at least one plate, the planetary gears of the first, the second, and the third pluralities of planetary gears coupled to the at least one plate via a number of pins about which the planetary gears axially rotate such that rotation of the at least one plate causes rotation of the planetary gears about the pins, and hence rotation of the first, the second and the third tubular shafts together. The first ring gear is formed on an inner diameter of the first ring, the second ring gear is formed on an inner diameter of the second ring, the third ring gear is formed on an inner diameter of a holder, the first sun gear extends from an outer diameter of the first tubular shaft, the second sun gear extends from an outer diameter of the second tubular shaft, and the third sun gear extends from an outer diameter of the third tubular shaft.

In at least some implementations, the first ring, the second ring and the at least one plate are concentrically aligned along a common axis of rotation. The first ring, the second ring and the at least one plate may each have a respective outer-most circumference and a respective radius between a respective axis of rotation and the respective outer-most circumference, the radii of the second and the at least one plate being equal to the radius of the first ring.

In at least some implementations, the first sun gear and the first tubular shaft are a first single piece unitary structure, the second sun gear and the second tubular shaft are a second single piece unitary structure and the third sun gear and the third tubular shaft are a third single piece unitary structure.

In at least some implementations, the first gear assembly further comprises a set of combined spur and bevel gears that drivingly couple a first set of gear teeth on the first tubular shaft with a second set of gear teeth on the first output member.

In at least some implementations, the second gear assembly further comprises a primary pitch bevel gear on the second tubular shaft located at a first distance along a longitudinal axis of the second tubular shaft, a secondary pitch bevel gear on the second tubular shaft located at a second distance along a longitudinal axis of the second tubular shaft, the second distance different from the first distance, a primary pitch member having a set of teeth drivingly engaged by the primary pitch bevel gear, a second pitch member, and a pitch idler gear, the pitch idler gear drivingly engaged by the secondary pitch bevel gear and the secondary pitch bevel gear having a set of teeth drivingly engaged by the pitch idler gear.

In at least some implementations, the third joint assembly further comprises at least one set of teeth on the third tubular shaft and at least one set of teeth on the second pitch member drivingly engaged by the at least one set of teeth on the third tubular shaft. The at least one set of teeth on the third tubular shaft comprises a first set of teeth on the third tubular shaft and a second set of teeth on the third tubular shaft, and the at least one set of teeth on the second pitch member comprises a first set of teeth on the second pitch member and a second set of teeth on the second pitch member, the first and the second set of teeth on the third tubular shaft and the first and the second set of teeth on the second pitch member arranged as two pairs of spur gears.

An apparatus may be summarized as comprising: a first input ring rotatable about a first axis; a second input ring rotatable about the first axis; a third input ring rotatable about the first axis; a first tubular shaft, the first tubular shaft coupled to rotate about the first axis in response to rotation of the first input ring about the first axis; a second tubular shaft, the second tubular shaft coupled to rotate about the first axis in response to rotation of the second input ring about the first axis; and a third tubular shaft, the first, second and the third tubular shafts coupled to rotate about the first axis in response to rotation of the third input about the first axis.

The first tubular shaft, the second tubular shaft and the third tubular shaft may each include a respective through passage, and the first tubular shaft, the second tubular shaft and the third tubular shaft, at least a portion of the first tubular shaft concentrically rotatably mounted in at least a portion of the through passage of the second tubular shaft, at least a portion of the second tubular shaft concentrically rotatably mounted in at least a portion of the through passage of the third tubular shaft, and the through passage of the third tubular shaft provides a cable fluid conduit run therethrough.

The apparatus may further comprise: an output structure; and a plurality of gears that transfer rotational motion of the first, the second and the third input rings into a roll, a pitch, and a yaw of the output structure.

The plurality of gears may, for example, include a set of combined spur and bevel gears that drivingly couple a first set of gear teeth on the first shaft with a second set of gear teeth on a first output member of the output structure as a first joint assembly. The plurality of gears may, for example, include a primary pitch bevel gear on the second shaft located at a first distance along a longitudinal axis of the second shaft, a secondary pitch bevel gear on the second shaft located at a second distance along a longitudinal axis of the second shaft, the second distance different from the first distance, a primary pitch member having a set of teeth drivingly engaged by the primary pitch bevel gear, a second pitch member, and a pitch idler gear, the pitch idler gear drivingly engaged by the secondary pitch bevel gear and the secondary pitch bevel gear having a set of teeth drivingly engaged by the pitch idler gear as a second joint assembly. The plurality of gears may, for example, include at least one set of teeth on the third shaft and at least one set of teeth on the second pitch member drivingly engaged by the at least one set of teeth on the third shaft as a third joint assembly. The plurality of gears may, for example, include three sun gears, and rotation of one of the sun gears adjusts a pitch of the output structure, rotation of another one of the sun gears adjust a roll of the output structure, and simultaneous rotation of all of the sun gears adjusts a yaw of the output structure.

An apparatus may be summarized as comprising: a first input member; a second input member; a third input member; a first output member; a second output member; a third output member; a plurality of gears that drivingly couple the first, the second and the third input members to the first, the second and the third output member, wherein the first input member controls only the first output member, the second input member controls only the second output member, and a third input member controls all of the first, the second and the third output members to concurrently rotate together.

The apparatus may further comprise: a first tubular shaft rotatable about a first axis in response to rotation of the first input member; a second tubular shaft rotatable about the first axis in response to rotation of the second input member; and a third tubular shaft rotatable about the first axis in response to rotation of the third input member, at least a portion of the first tubular shaft at least partially received within at least a portion of the second tubular shaft for rotation with respect thereto and at least a portion of the second tubular shaft at least partially received within at least a portion of the third tubular shaft for rotation with respect thereto.

The first, the second and the third input members may be operable to have a combined movement in three DOF.

An apparatus may be summarized as comprising: a first tubular shaft rotatable around a first axis; a second tubular shaft rotatable around the first axis; a third tubular shaft rotatable around the first axis; a first output member; a second output member, the first and second output members coupled such that the first output member can only rotate around a longitudinal axis with respect to the second output member; and a plurality of gears that drivingly couple the first and the second output members to the first, the second and the third tubular shafts, wherein the rotation of the first tubular shaft around the first axis with respect to the third tubular shaft controls the rotation of the first output member around a first output axis, the rotation of the second tubular shaft around the first axis with respect to the third tubular shaft controls the rotation of the second output member around a second output axis, and the rotation of the first, second, and third tubular shafts in unison around the first axis controls the rotation of the first and second output members around a third output axis.

The first tubular shaft, the second tubular shaft and the third tubular shaft may each include a respective through passage, and at least a portion of the first tubular shaft is concentrically rotatably mounted in at least a portion of the through passage of the second tubular shaft, at least a portion of the second tubular shaft is concentrically rotatably mounted in at least a portion of the through passage of the third tubular shaft, and the through passage of the third tubular shaft provides a cable fluid conduit run therethrough.

The first, the second and the third tubular shafts are operable to have a combined movement in three DOF of the first output member.

A first gear assembly comprises a set of combined spur and bevel gears that drivingly couple a first set of gear teeth on the first tubular shaft with a second set of gear teeth on the first output member.

A second gear assembly further comprises a primary pitch bevel gear on the second tubular shaft located at a first distance along a longitudinal axis of the second tubular shaft, a secondary pitch bevel gear on the second tubular shaft located at a second distance along a longitudinal axis of the second tubular shaft, the second distance different from the first distance, a primary pitch member having a set of teeth drivingly engaged by the primary pitch bevel gear, a second pitch member, and a pitch idler gear, the pitch idler gear drivingly engaged by the secondary pitch bevel gear and the secondary pitch bevel gear having a set of teeth drivingly engaged by the pitch idler gear.

Rotation of the first and second output members are supported by the first, second, and third tubular shafts, such that the rotation of the first, second, and third shafts in unison around the first axis rotates the first and second output members around the first axis.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1:
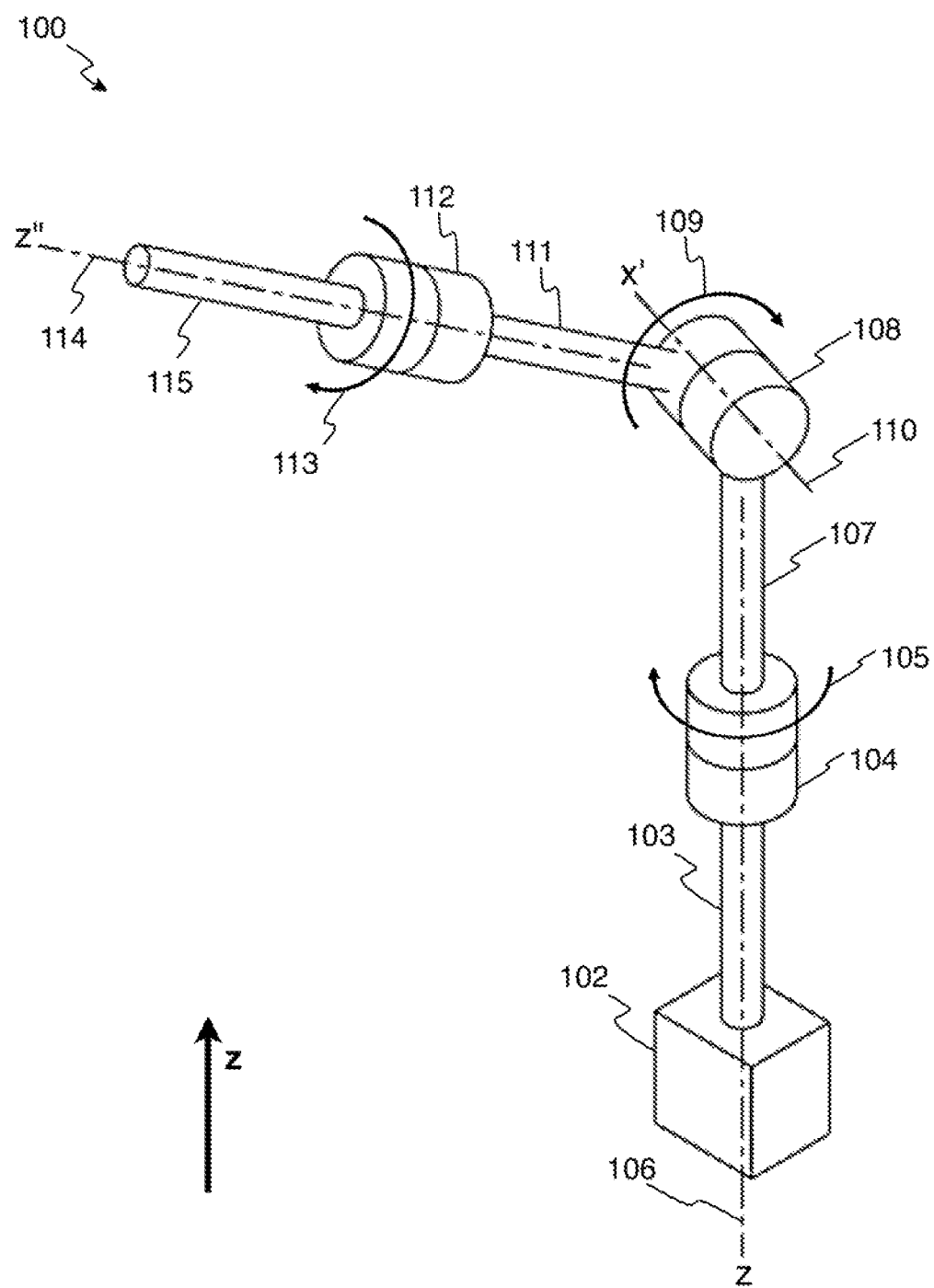
FIG. 1 is an isometric view of an abstracted representation of a mechanism including a number of links and joints, and which illustrates three degrees-of-freedom (DOF) operation of a distal end thereof, to permit control over roll, pitch and yaw of the distal end.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with robots, robotic appendages, linkages, and cables or actuators, have not been shown or described in detail to avoid unnecessarily obscuring descriptions of the implementations or embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one implementation" or "an implementation" or to "one embodiment" or "an embodiment" means that a particular feature, structure or characteristic described in connection with the implementation or embodiment is included in at least one implementation or embodiment. Thus, the appearances of the phrases "one implementation" or "an implementation" or "in one embodiment" or "in an embodiment" in various places throughout this specification are not necessarily all referring to the same implementation or embodiment. Furthermore, the particular features, structures, or characteristics may be combined in any suitable manner in one or more implementations or embodiments.

The terms "apparatus" and "mechanism" are used interchangeably herein. As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Described herein is an example implementation of a mechanism or apparatus that allows control of a distal end or output structure with three degrees-of-freedom, for instance allowing control of roll, pitch and yaw of the output structure. Those skilled in the art would recognize that many features of the implementation can be grouped together, split apart, reorganized, removed, or duplicated. While useful in robotics, for instance as a robotic appendage, the mechanism can be used in a large variety of other practical applications.

The mechanism operates similarly to a ball-joint, in that it allows for full rotational degrees of freedom, but, unlike a ball-joint, can be driven in all three degrees of freedom, often called pitch, yaw, and roll or procession, nunation, and intrinsic rotation. In this description, the degrees-of-freedom (DOF) are called yaw, pitch, and roll. This mechanism allows for control of each of the three DOF through the actuation of a respective input. In this mechanism, the input members are concentric rings actuated by rotation around their longitudinal or rotational axes, meaning all three DOF of the mechanism can be actuated by the rotation of concentric rings.

FIG. 1 shows an abstract representation of a mechanism 100, schematically illustrating the three DOF accessible to a distal end or output structure of the mechanism 100 via included joints described herein. In particular, FIG. 1 is a simplified drawing of an output rotation of the distal end of the mechanism 100.

The mechanism 100 is coupled to the supporting member 102 which physically supports mechanism 100 and provides a reference point for movements and rotations. A first rotational joint 104 couples supporting member 102 and a first link 103. The first link 103 includes a proximal end, a distal end, and major axis between the proximal and distal ends, which in some implementations, is generally aligned with a z-axis 106. The joint 104 allows for a yaw rotation 105 around the z-axis 106 of the supporting member 102. Coupled to the output of the first rotational joint 104 is a second link 107. Coupled to the second link 107 is a second rotational joint 108. The second rotational joint 108 allows for a pitch rotation 109 around an x'-axis 110, the x'-axis 110 perpendicular to the z-axis 106. The x'-axis 110 rotates around z-axis 106 in accordance with yaw rotation 105. Coupled to the output of the second rotational joint 108 is a third link 111 which is coupled to a third rotation joint 112. The third rotation joint 112 allows for the roll rotation 113 around z''-axis 114 the z''-axis 114 which may be perpendicular to the x'-axis 110. The z''-axis 114 is defined as the major axis of the third link 111 which changes with accordance to yaw rotation 105 and pitch rotation 109. The z-axis 106 and the z''-axis 114 are not generally parallel, but can be parallel if the pitch rotation 109 is set to 0 degrees relative to the z-axis 106.

Figure 2:
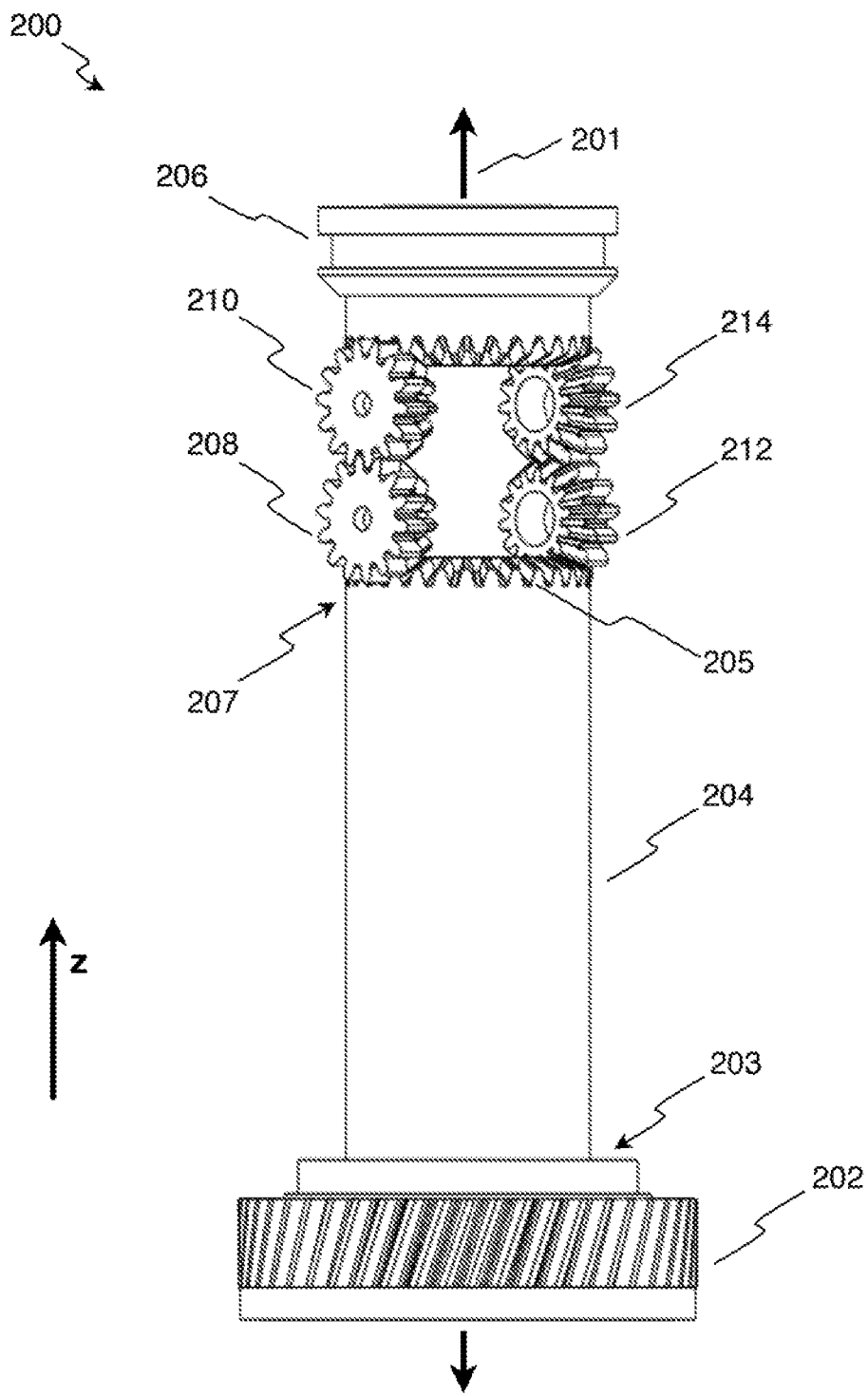
FIG. 2 is an isometric view of a first assembly portion of the mechanism, according to one illustrated implementation, the first assembly including an inner-most tubular shaft.

As an overview, FIGS. 2, 3, and 4 respectively show a first assembly 200, the first assembly and a second assembly 300, and the first, the second and a third assembly 400 of the mechanism 100. Each of the first, second and third assemblies has a respective tubular shaft 204, 304, 404 and gears. The tubular shafts 204, 304, 404 are arranged concentrically along a common axis of rotation 201. The tubular shafts 204, 304, 404 are arranged in a nested configuration, like Matryoshkaw dolls, the second tubular shaft 304 arrayed radially outward with respect to the first tubular shaft 204, and the third tubular shaft 404 arrayed radially outward with respect to the second tubular shaft 304. Likewise, at least some of the sets of gears of the first, second and third assemblies are arranged in a nested configuration.

For example, a first tubular shaft 204 is received in clearance fit by a through passage of the second tubular shaft 304. The second tubular shaft 204 is received in clearance fit by a through passage of the third tubular shaft 404. The terms first, second, and third may be replaced by the terms inner, middle and outer, respectively, or replaced by the terms innermost, intermediate or intervening, and outermost, respectively. In some implementations, more than three layers of tubular shafts may be present.

FIG. 2 shows the first assembly 200 of the mechanism 100, according to at least one illustrated implementation. The first assembly 200 includes a first sun-gear 202 and the first tubular shaft 204. The first sun-gear 202 is extends radially outwardly from a first end 203 of the first tubular shaft 204. The first tubular shaft 204 has an outer diameter smaller than an outer diameter of the first sun-gear 202. In at least some implementations, the first sun-gear 202 and the first tubular shaft 204 may be a single, monolithic or unitary piece, or alternatively two pieces fixed to one another. Both the first sun-gear 202 and the first tubular shaft 204 may have hollow cylindrical cross-sections, best illustrated in FIG. 6. The first tubular shaft 204 terminates in a bevel gear 205 at a second end 207 of the first tubular shaft 204, the second end located opposite the first end 203 along a longitudinal or rotational axis 201 of the first tubular shaft 204.

The first tubular shaft 204 is coupled to a roll link 206 through a set of four combination spur and bevel gears 208, 210, 212, and 214. The bevel gear 205 on the first shaft 204 couples to the combination spur and bevel gears 208 and 212 which share an axis of rotation parallel to the x'-axis 110 (FIG. 1). The combination spur and bevel gears 208 and 212 drivingly couple to the combination spur and bevel gears 210 and 214, respectively, which share an axis of rotation parallel to the x'-axis 110 (FIG. 1). The combination spur and bevel gears 210 and 214 drivingly couple to the roll link 206. The combination spur and bevel gears 208, 210, 212, and 214 each consists of a spur gear portion and a bevel gear portion. In this implementation, the bevel gear portions are on a radially inner side of the gears and drivingly couple with the bevel gear portions on the first tubular shaft 204 and the roll link 206. In this implementation, the spur gear portions are on the radially outer side of the gears and drivingly couple with the spur gear component of other combination spur and bevel gears. The first assembly of the mechanism 200 is chiefly responsible for the roll rotation 113 (FIG. 1).

Figures 3A, 3B:
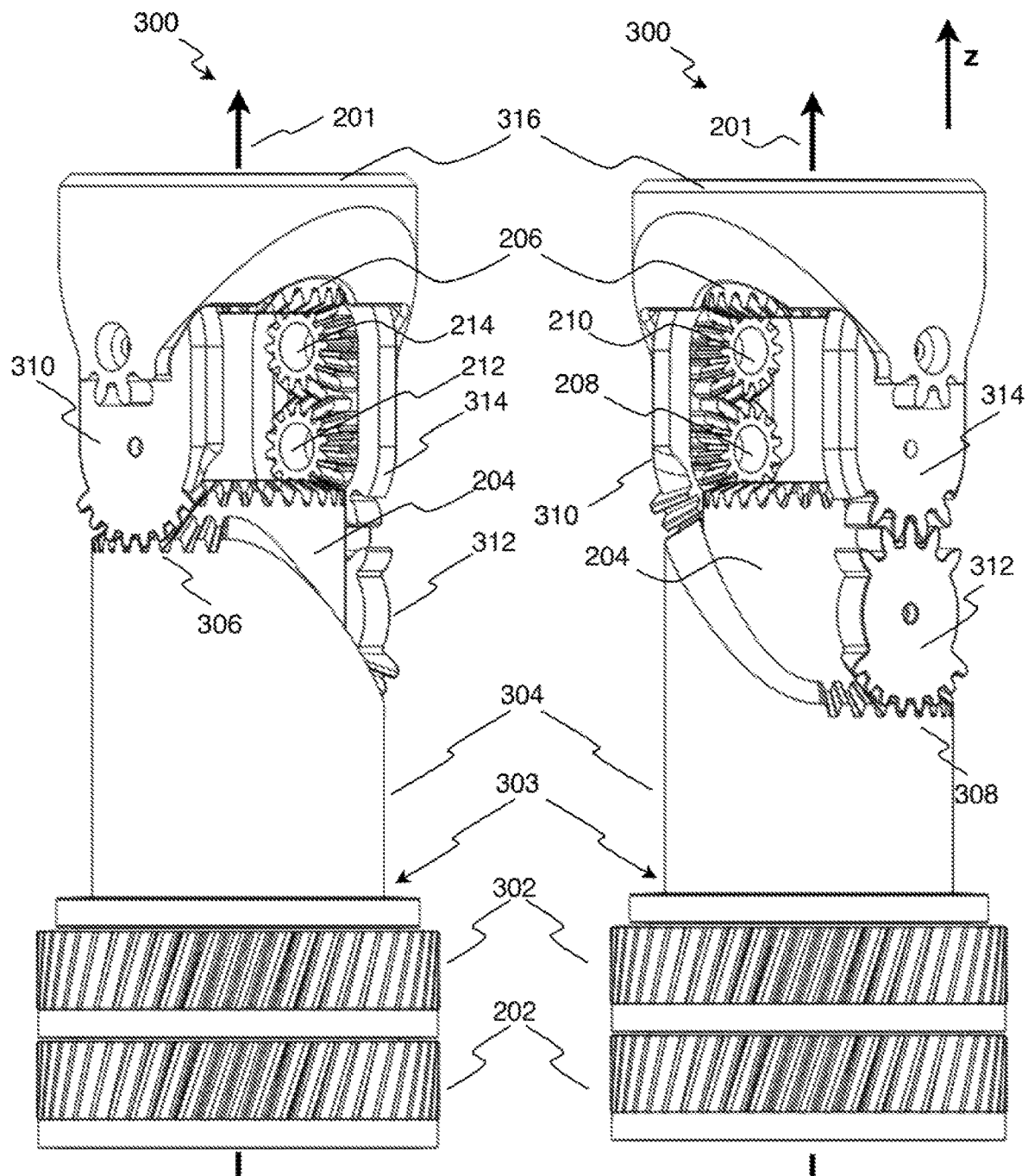
FIG. 3A is a front left isometric view of a second assembly portion of the mechanism, according to one illustrated implementation, the second assembly including an intermediate tubular shaft which is concentrically arranged radially outward of the innermost tubular shaft.
FIG. 3B is a front right isometric view of a second assembly portion of the mechanism, according to one illustrated implementation, the second assembly including an intermediate tubular shaft which is concentrically arranged radially outward of the innermost tubular shaft.

FIGS. 3A and 3B show the second assembly 300 of the mechanism 100 positioned with respect to the first assembly 200 of the mechanism 100, according to at least one illustrated implementation. At least portions of the second assembly 300 are described herein as positioned around or about or radially outward of the first assembly 200 (FIG. 2). Two views (FIGS. 3A, 3B) are provided for clarity. Both views (FIGS. 3A, 3B) are a frontal view that has been pivoted around the vertical axis by 45 degrees to either direction.

The second assembly 300 includes a second sun-gear 302 and the second tubular shaft 304. The second sun-gear 302 extends radially outwardly from a first end 303 of the second tubular shaft 304. The second tubular shaft 304 has an outer diameter smaller than an outer diameter of the second sun-gear 302. In at least some implementations, the second sun-gear 302 and the second tubular shaft 304 may be a single, monolithic or unitary piece, or alternatively two pieces fixed to one another. Both the second sun-gear 302 and the second tubular shaft 304 may have hollow cylindrical cross-sections, best illustrated in FIG. 6. The second sun-gear 302 is concentrically arranged with the first sun-gear 202 to rotate about a common axis of rotation 201. A ring bearing 303 couples the first sun-gear 202 and the second sun-gear 302, allowing free rotation of the two sun gears 202, 302 with respect to one another about the common axis of rotation 201 (e.g., an axis extending in the vertical direction in FIGS. 3A, 3B).

The second tubular shaft 304 terminates in two bevel gear sections at different heights or positions along a length of the second tubular shaft 304, namely: a primary pitch bevel gear 306 and a secondary pitch bevel gear 308. The primary pitch bevel gear 306 is drivingly coupled to a primary pitch member 310 of the second assembly 300 through meshed gear teeth. The primary pitch member 310 is coupled to the combination spur and bevel gears 208 and 210 such that the combination spur and bevel gears 208 and 210 can rotate freely around one axis each with respect to the primary pitch member 310. The secondary pitch bevel gear 308 of the second assembly 300 is drivingly coupled to a secondary pitch member 314 of the second assembly 300 through a pitch idler gear 312 of the second assembly 300. The pitch idler gear 312 has a bevel gear side that drivingly couples to the secondary pitch bevel gear 308 and a spur gear side that drivingly couples to the secondary pitch member 314. The secondary pitch member 314 is coupled to the combination spur and bevel gears 212 and 214 and is coupled to the combination spur and bevel gears 212 and 214 such that the combination spur and bevel gears 212 and 214 can rotate freely around one axis each with respect to the secondary pitch member 314. The pitch output member 316 is coupled to the roll link 206 through a ring bearing 315 of the second assembly 300 such that the roll link 206 can freely rotate within the pitch output member 316 around the z"-axis 114 (FIG. 1). The pitch output member 316 also couples to the primary pitch member 310 and the secondary pitch member 314 such that the pitch output member 316 can freely rotate around the same axis as the combination spur and bevel gears 210 and 214 rotate about.

Figures 4A, 4B:
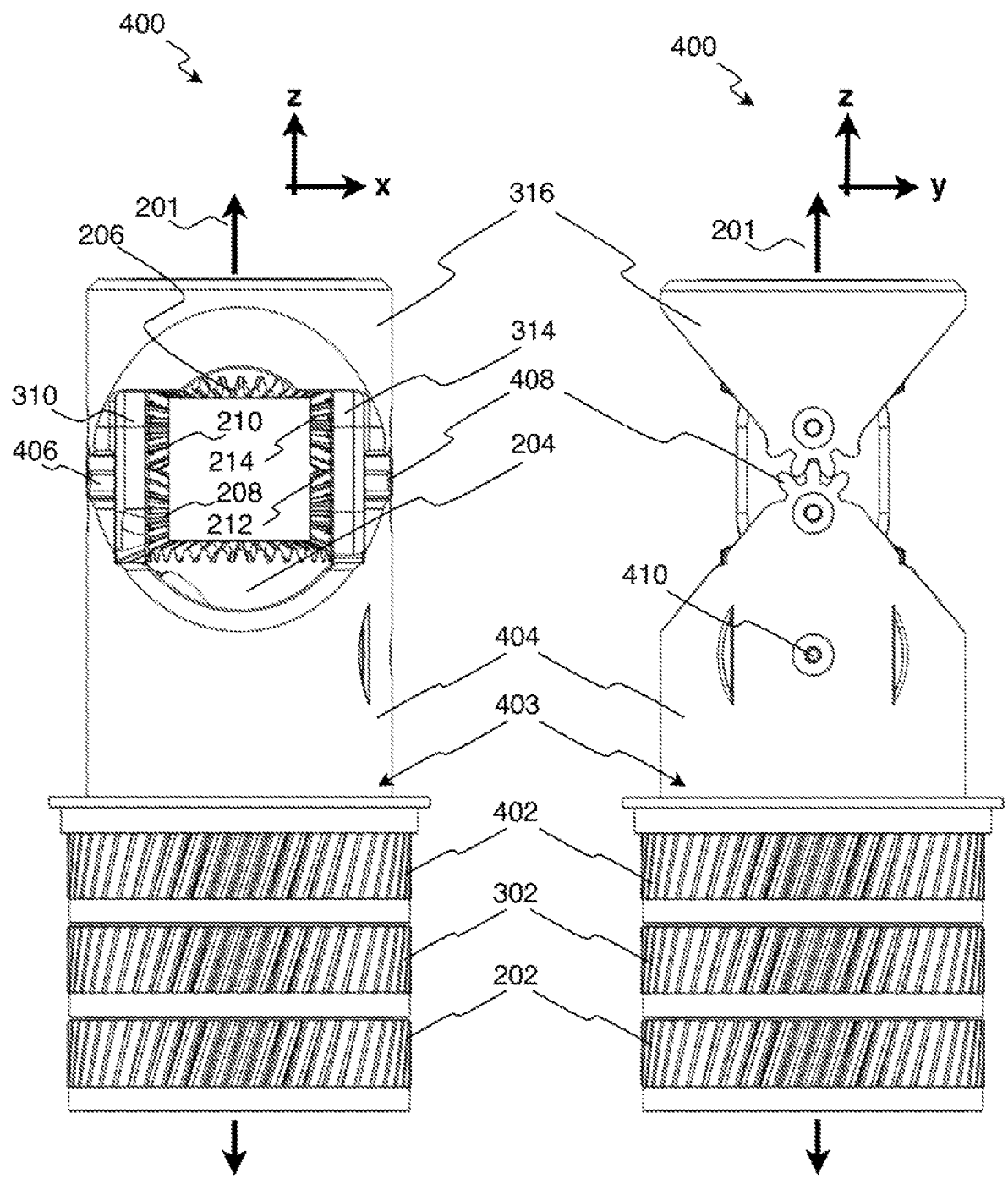
FIG. 4A is a front elevational view of a third assembly portion of the mechanism, according to one illustrated implementation, the third assembly including an outer-most tubular shaft which is concentrically arranged radially outward of the intermediate tubular shaft.
FIG. 4B is a right side elevational view of a third assembly portion of the mechanism, according to one illustrated implementation, the third assembly including an outer-most tubular shaft which is concentrically arranged radially outward of the intermediate tubular shaft.

FIGS. 4A and 4B show the third assembly 400 of the mechanism 100 positioned with respect to the first assembly 200, and the second assembly 300 of the mechanism 100, according to at least one illustrated implementation. At least portions of the third assembly 400 are described herein as positioned around or about or radially outward of the second assembly 300 (FIG. 3). Two views (FIGS. 4A, 4B) are provided for clarity.

The third assembly 400 includes a third sun-gear 402 and the third tubular shaft 404. The third sun-gear 402 extends radially outwardly from a first end 403 of the third tubular shaft 404. The third tubular shaft 404 has an outer diameter smaller than an outer diameter of the third sun-gear 402. In at least some implementations, the third sun-gear 402 and the third tubular shaft 404 may be a single, monolithic or unitary piece, or alternatively two pieces fixed to one another. Both the third sun-gear 402 and the third tubular shaft 404 may have hollow cylindrical cross-sections, best illustrated in FIG. 6. The third sun-gear 402 is concentrically arranged with the second sun-gear 302 to rotate about a common axis of rotation 201. A ring bearing 403 couples the second sun-gear 302 and the third sun-gear 402, allowing free rotation of the two sun gears 302, 402 with respect to one another about the common axis of rotation 201 (e.g., an axis extending in the vertical direction in FIGS. 4A 4B).

The third tubular shaft 404 terminates at two spur gearings 406 and 408 of the third assembly 400. The two spur gearings 406 and 408 are drivingly coupled to the primary pitch member 310 and the secondary pitch member 314, respectively. The spur gearing 406 is coupled to the primary pitch member 310 such that the two pieces can freely rotate around the same axis as the combination spur and bevel gear 208. The spur gearing 408 is coupled to the secondary pitch member 314 such that the two pieces can freely rotate around the same axis as the combination spur and bevel gear 212. The third tubular shaft 404 also couples to the pitch idler gear 312 at a bearing 410 of the third assembly 400 such that the pitch idler gear 312 can freely rotate within the third tubular shaft 404 around an axis parallel to the x'-axis 110 (FIG. 1).

Figure 5:
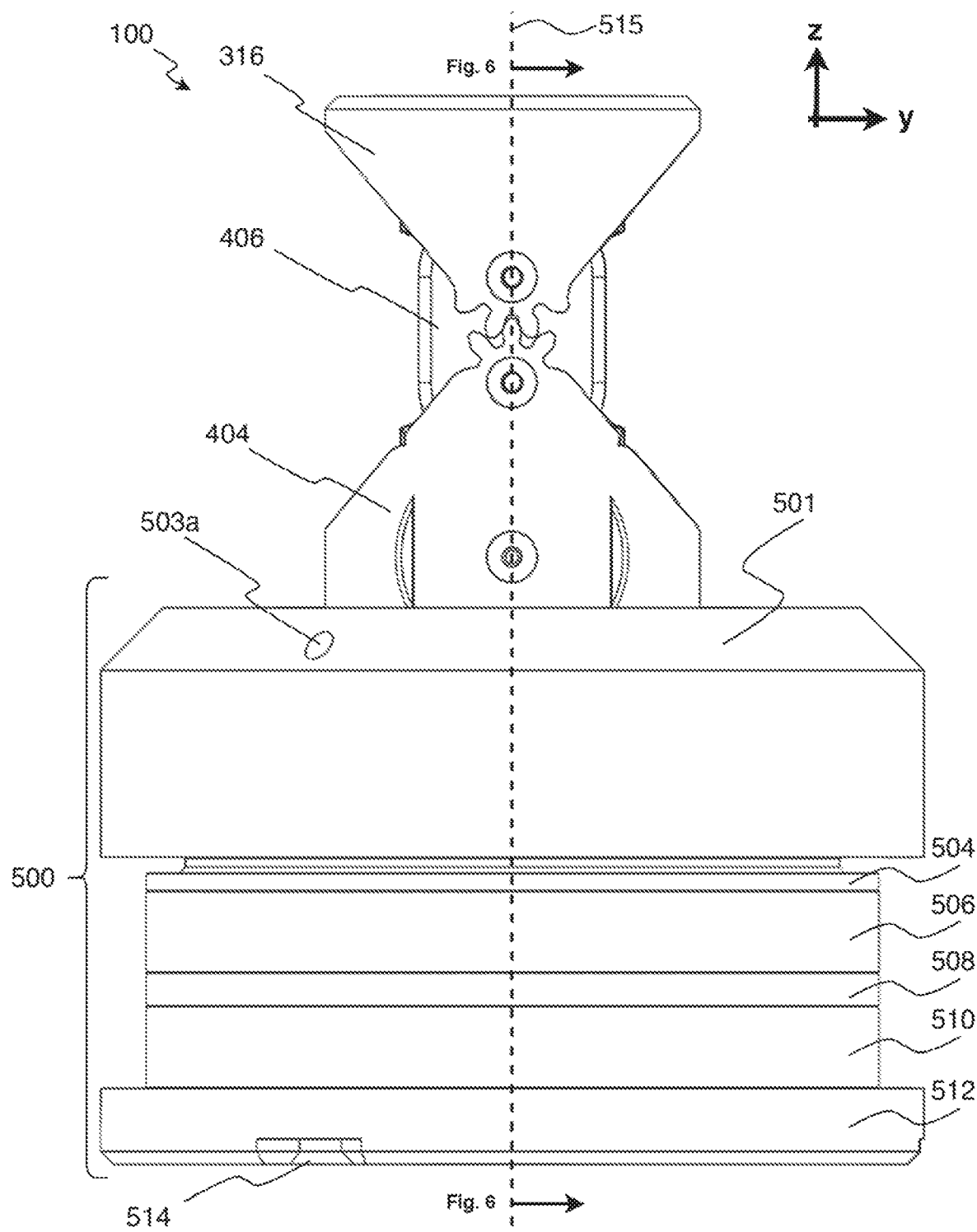
FIG. 5 is a right side elevational view of a portion of the mechanism, according to one illustrated implementation, in particular showing a top holder, ring gears, plates and a bottom holder.

FIG. 5 shows the mechanism 100, according to at least one illustrated implementation. In particular, FIG. 5 illustrates a carrier assembly 500 of the mechanism 100 positioned with respect to the first, second and third assemblies 200, 300, 400. At least portions of the carrier assembly 500 are described herein as positioned around or about or radially outward the first, second, and third assemblies 200, 300, 400 (FIGS. 2, 3A, 3B, 4A, 4B). The carrier assembly 500 of the mechanism 100 provides input links or structures and support members for the mechanism 100.

The carrier assembly 500 includes a top holder 501. The top holder 501 may be coupled to the third tubular shaft 404 by a ring bearing 502 of the carrier assembly 500, allowing the top holder 501 and the third tubular shaft 404 to rotate with respect to one another freely around a common axis of rotation (e.g., an axis extending in the vertical direction in FIG. 5). The top holder 501 may have a number of through holes 503a, 503b (e.g., three through holes, only one visible in FIG. 5, and only two visible in FIGS. 8-11) spaced radially from the axis of rotation and spaced circumferentially evenly around a perimeter of the top holder 501. It is recognized that other approaches to coupling or even fastening the various structures of the carrier assembly 500 may be employed.

Concentrically arrayed (e.g., below) the top holder 501 is a stack of circular members that include a top carrier plate 504, a first ring gear 510, a bottom carrier plate 508, and a second ring gear 506. The carrier assembly 500 also includes a bottom holder 512 concentrically arrayed (e.g., below) the top holder 501. The bottom holder 512 has a number of through holes 514a, 514b, and 514c (e.g., three through holes, only one visible in FIG. 5, three visible in FIG. 7, and only two visible in FIGS. 8-11) spaced radially from the axis of rotation and spaced circumferentially evenly distributed around a perimeter of the bottom holder 512.

The bottom holder 512 is drivingly coupled to the first sun-gear 202 (FIG. 2) by a ring bearing 513. The top holder 501 and the bottom holder 512 are bolted together through matching or corresponding pairs of through holes 503a, 503b, 503c and 514a, 514b, 514c and suitable fasteners (e.g., bolts and nuts, threaded bolts, threaded screws, rivets).

Figure 6:
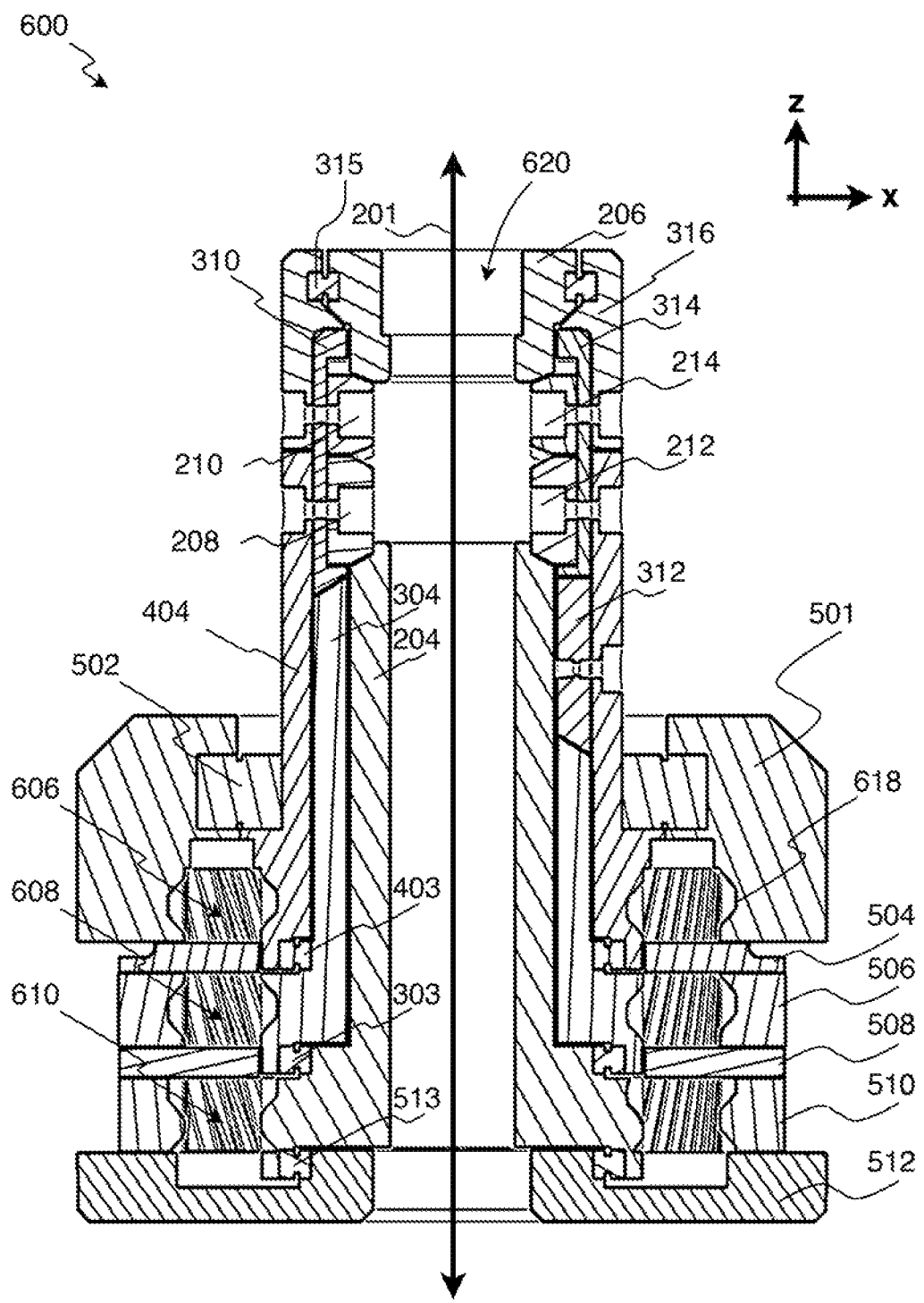
FIG. 6 is a cross-sectional isometric view of the portion of the mechanism of FIG. 5 taken along cross-section line FIG. 6, according to one illustrated implementation.

The coupling between the carrier elements and the other layers is better illustrated in FIG. 6 which depicts a sectional view of the complete mechanism 100 when cut by a plane 515 in FIG. 5.

Figure 7:
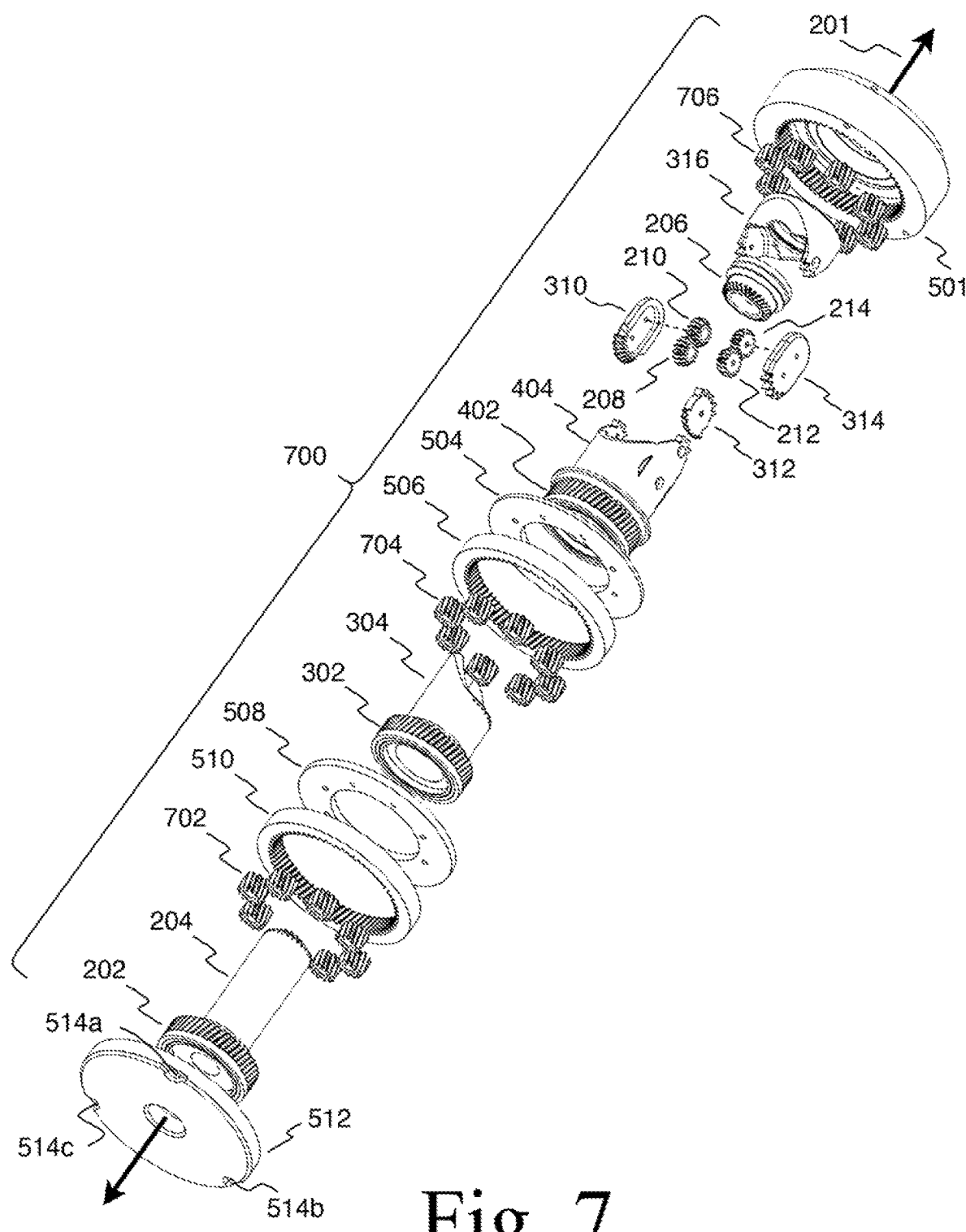
FIG. 7 is an exploded view of the mechanism, according to one illustrated implementation.

FIG. 6 depicts the sectional view of the mechanism 100 viewed from the right side. The roll link 206 is coupled to the pitch output member 316 through a ring bearing 315 and cannot pitch, yaw, or translate with respect to the pitch output member 316. Similarly, the top holder 501 is coupled to the third tubular shaft 404 through ring bearing 502, meaning the third tubular shaft 404 can only roll with respect to the top holder 501. The third tubular shaft 404 and the second tubular shaft 304 are similarly coupled through ring bearing 403 and the second tubular shaft 304 and the first tubular shaft 204 are coupled through ring bearing 303. Similarly, the bottom holder 512 and the first tubular shaft 204 are coupled through ring bearing 513. The top holder 501 and the bottom holder 512 are fixed with one another and apply axial force on the first, second and third tubular shafts 204, 304, and 404, respectively. The top holder 501 includes a ring gear 618 located on the inner side of the top holder 501. The ring gear 618 and the third sun-gear 402 form a gear cavity 606 in which planetary gears can sit, forming a planetary gear system. The second ring gear 506 and the second sun-gear 302 form a gear cavity 608 in which planetary gears can sit, forming a planetary gear system. The first ring gear 510 and the first sun-gear 202 form a gear cavity 610 in which planetary gears can sit, forming a planetary gear system. All the planetary gears in cavities 606, 608, and 610 are coupled together via through holes in the top carrier plate 504 and the bottom carrier plate 508 and suitable fasteners (e.g., pins, rivets, bolts and nuts, journal/bearing) such that all the planetary gears can freely rotate around respective axis of rotation (e.g., vertical axis in view of drawing sheet) with respect to each other and the carrier plates 504, 508 and the planetary gears and the carrier plates can all rotate together around a central axis or common axis of rotation 201. (The planetary gears are best illustrated in FIG. 7.) As can be seen in FIG. 6, a cylindrical cavity or passage 620 exists extending through the entire length of the mechanism 100. The cylindrical cavity or passage 620 can be used to house electrical wiring, fluid carrying tubing, or the like, and thus be denominated as a cable fluid conduit run. Such may be particularly advantageous in applications like robotics where tools, transducers and/or sensors may be located at a distal end of the mechanism 100 or at a distal end of appendage of which the mechanism 100 forms a part.

FIG. 7 shows an exploded view of the mechanism 100 including components illustrated in and described with respect to FIGS. 2, 3A, 3B, 4A, 4B, 5, and 6. As shown the components are displaced vertically except for the primary pitch member 310 and the secondary pitch member 314 which have been moved horizontally to better expose the combination spur and bevel gears 208, 210, 212, and 214 inside.

The vertically exploded view of the mechanism 700 includes a set of eight first planetary gears 702 which sit within gear cavity 610 and couple the first ring gear 510 to the first layer sun-gear 202. A set of eight second planetary gears 704 sit within gear cavity 608 and couple the first ring gear 506 to the second sun-gear 302. A set of eight third planetary gears 706 sit within cavity 606 and couple the ring gear 618 on the top holder 501 to the third sun-gear 402. All the planetary gears are coupled axially to carrier plates 504 and 508 and are free to rotate around respective rotational axes but cannot translate or rotate otherwise with respect to the carrier plates 504 and 508.

Figure 8:
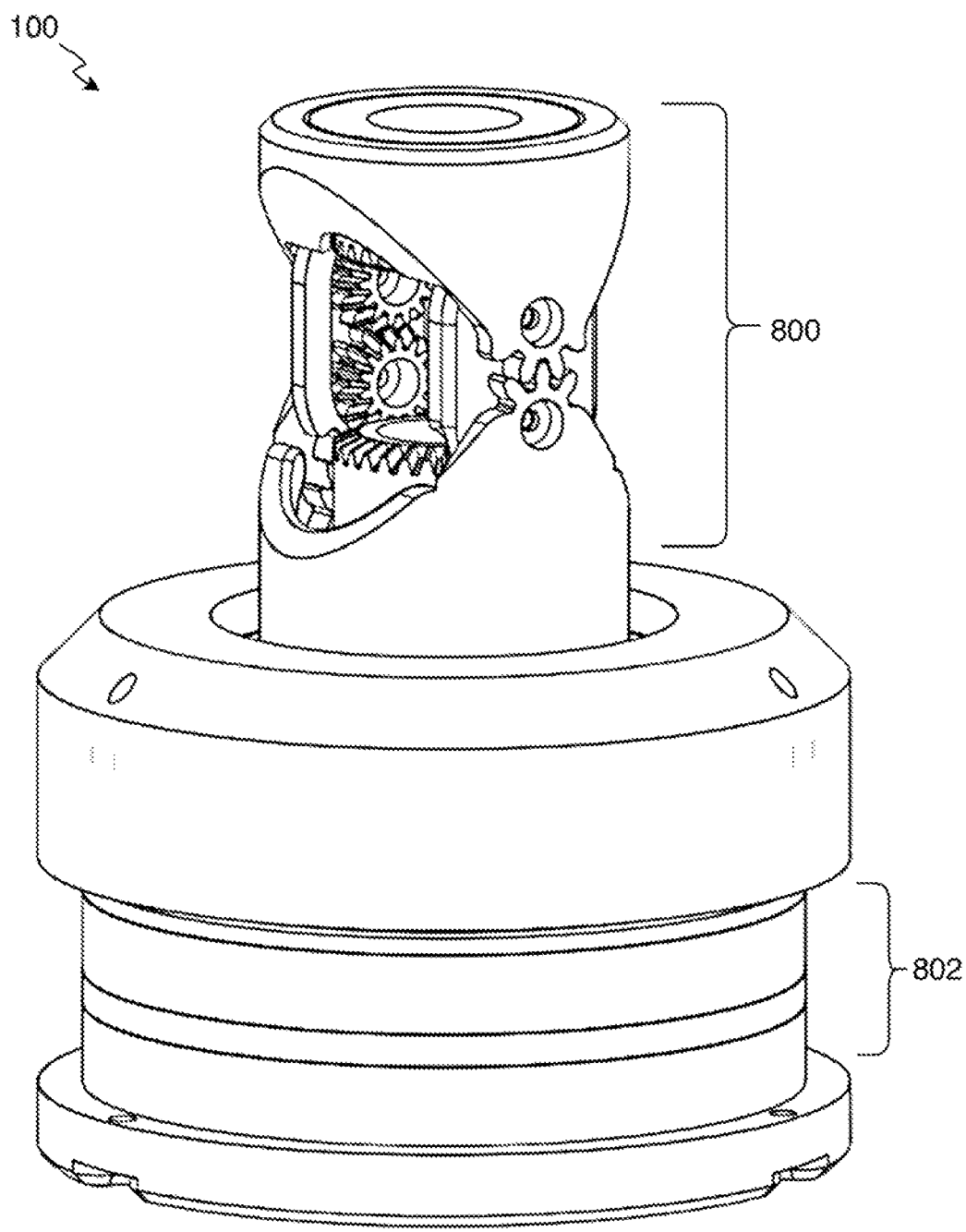
FIG. 8 is an isometric view of the mechanism, according to one illustrated implementation, illustrating a default state from which roll, pitch and yaw of an output structure of the apparatus may be adjusted by inputs via input members (e.g., rings, plates).

FIG. 8 shows the mechanism 100, according to at least one illustrated implementation. In particular, FIG. 8 shows the mechanism 100 with an output structure 800 (e.g., roll link 206, pitch output member 316, third tubular shaft 404) in a default position, from which roll, pitch and/or yaw can be adjusted by inputs via input members of an input structure 802 (e.g., ring gear 506, ring gear 510, plates 504, 508).

Figure 9:
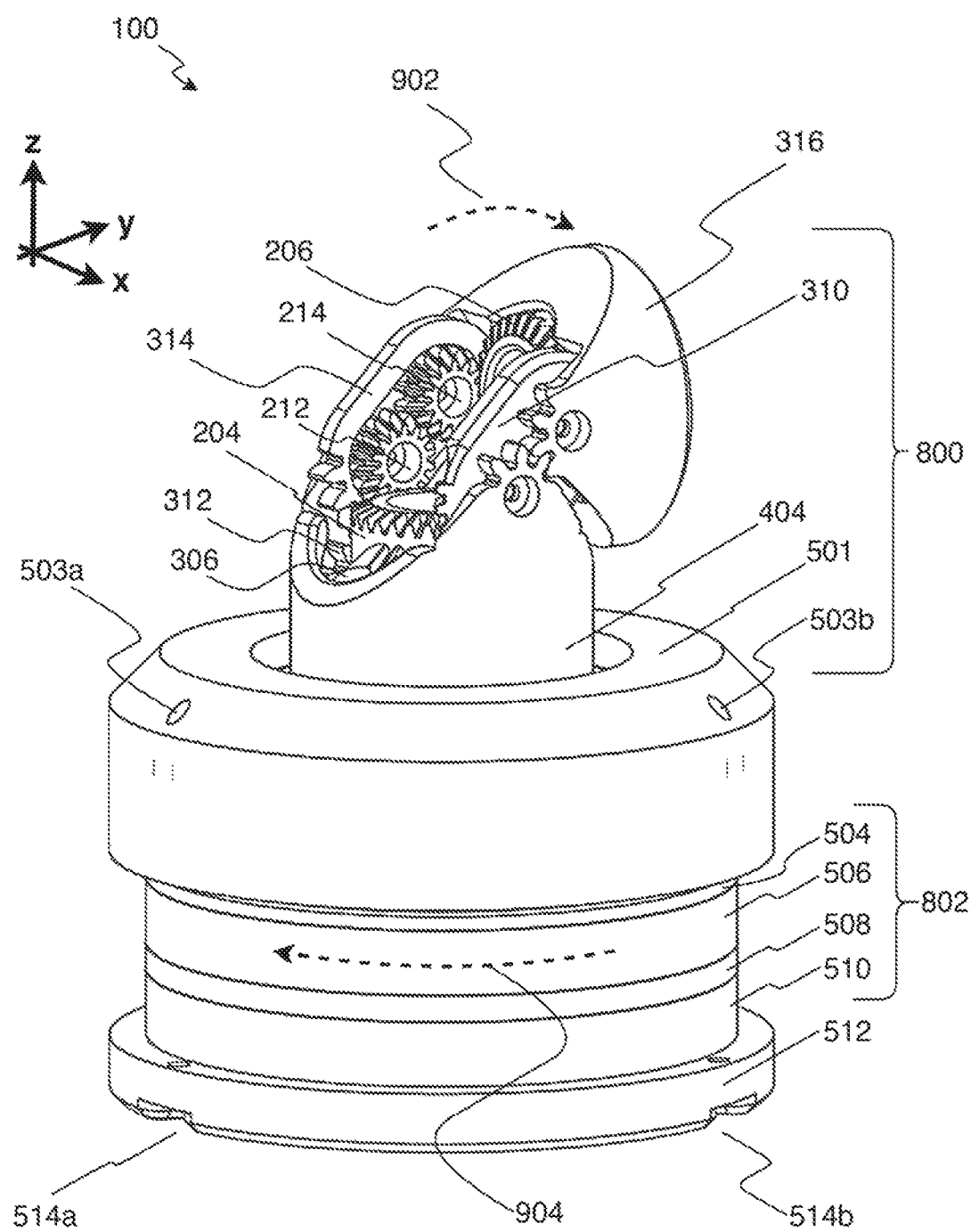
FIG. 9 is an isometric view of the mechanism illustrating an input via a first input ring and a corresponding output (e.g., pitch adjustment), according to one illustrated implementation.

FIG. 9 shows the mechanism 100, according to at least one illustrated implementation. In particular, FIG. 9 illustrates a pitch action (depicted in FIG. 9 by an arrow 902) of the output structure 800 of the mechanism 100. The pitch action 902 is engaged by the rotation (depicted in FIG. 9 by an arrow 904) of the second ring gear 506 around the vertical axis with the top holder 501, the top carrier plate 504, and the bottom carrier plate 508 fixed. This causes the second planetary gears 704 to rotate around respective vertical axes. When the second planetary gears 704 rotate, the second sun-gear 302 also rotates, causing the entire second tubular shaft 304 to rotate. The rotation of the second tubular shaft 304 is in the opposite direction of the rotation of the second ring gear 506. As the second tubular shaft 304 rotates around the vertical axis, the primary pitch bevel gear 306 rotates the primary pitch member 310 around the horizontal axis and the secondary pitch bevel gear 308 rotates the secondary pitch member 314 through the pitch idler gear 312. The rotation of the primary pitch member 310 is in the same rotational direction as the rotation of the secondary pitch member 314 due to the nature of the couplings to the second tubular shaft 304. As the primary pitch member 310 rotates around the horizontal axis shared with the combination spur and bevel gear 208, the combination spur and bevel gear 208 does not rotate due to being engaged with the first tubular shaft 204 which is also engaged to the combination spur and bevel gear 212 which is engaged with the secondary pitch member 314. The action of the two pitch members 310 and 314 does not rotate the first tubular shaft 204 as the two rotations cause equal torque to be applied in opposite rotational directions around the vertical axis of the first tubular shaft 204. Since the two pitch members 310 and 314 rotate but combination gears 208 and 212 do not rotate, the combination gears 210 and 214 must rotate in order for the spur gearing to remain properly engaged. The rotation of the opposed combination spur and bevel gears 210 and 214 is in the same direction around the shared axis, and will therefore not rotate the roll link 206 around the z"-axis 114 as the two combination spur and bevel gears 210 and 214 apply equal torque in opposite rotational directions; instead the rotation causes the roll link 206 to rotate around the horizontal axis of the combination spur and bevel gear 210 and 214 in order for the bevel gearing to remain engaged. The output pitch rotation 902 happens around the axis of the combination spur and bevel gears 210 and 214. The pitch output member 316 rotates along with the roll link 206 and provides stability through the spur gear coupling with the third tubular shaft 404.

Figure 10:
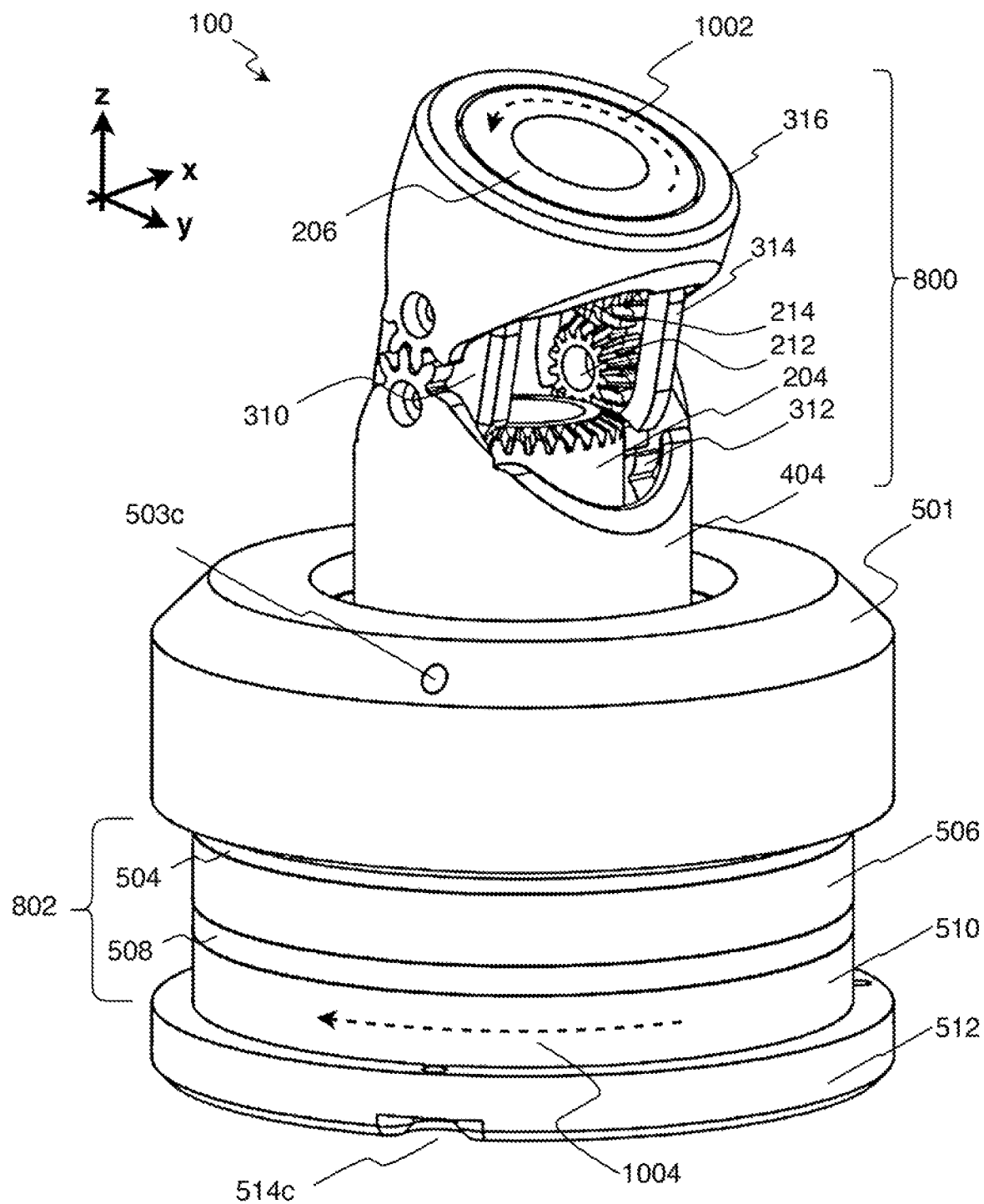
FIG. 10 is an isometric view of the mechanism illustrating an input via a second input ring and a corresponding output (e.g., roll adjustment), according to one illustrated implementation.

FIG. 10 shows the mechanism 100, according to at least one illustrated implementation. In particular, FIG. 10 illustrates a roll action (depicted in FIG. 10 by an arrow 1002) of the output structure 800 of the mechanism 100. The roll action 1002 is engaged by the rotation (depicted in FIG. 10 by an arrow 1004) of the first ring gear 510 around the vertical axis with the top holder 501, top carrier plate 504, and bottom carrier plate 508 fixed. This causes the first planetary gears 702 to rotate around vertical axes. When the first planetary gears 702 rotate, the first sun-gear 202 rotates also, causing the entire first tubular shaft 204 to rotate. The rotation of the first tubular shaft 204 is in the opposite direction of the rotation of the first ring gear 510. The rotation of the first tubular shaft 204 is transmitted to the roll link 206 through the combination spur and bevel gears 208, 210, 212, and 214. The roll action 1002 of the roll link 206 is in the opposite direction of the input rotation (arrow 1004). The roll action 1002 actuates regardless of the pitch angle set by the pitch action 902 illustrated in FIG. 9, due to the presence of the combination spur and bevel gears 208, 210, 212, and 214 which act as idler gears.

Figure 11:
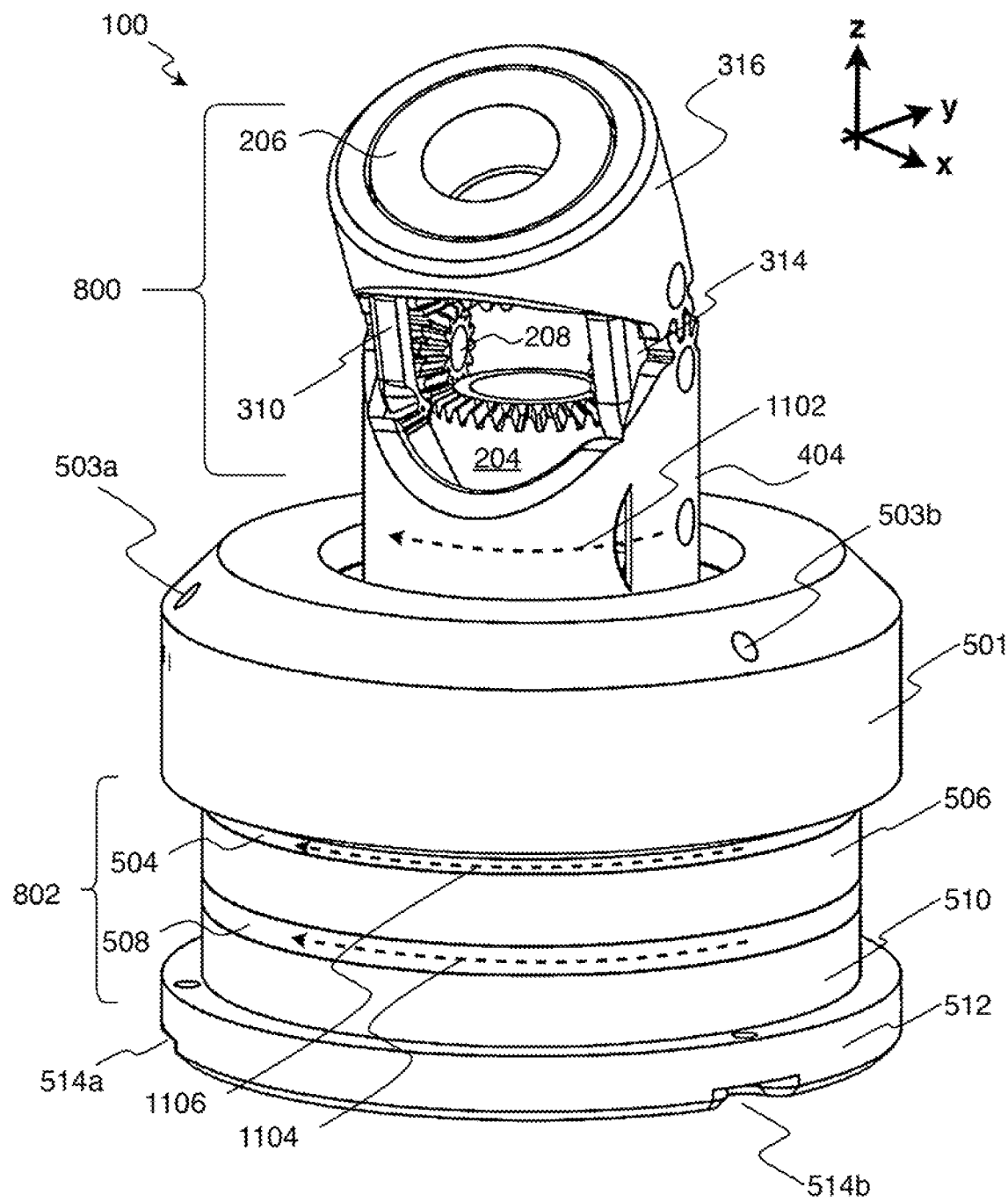
FIG. 11 is an isometric view of the mechanism illustrating an input via a pair of plates and a corresponding output (e.g., a yaw adjustment), according to one illustrated implementation.

FIG. 11 shows the mechanism 100, according to at least one illustrated implementation. In particular, FIG. 11 illustrates a yaw action (depicted in FIG. 11 by an arrow 1102) of the output structure 800 of the mechanism 100. The yaw action 1102 is engaged by the rotation (depicted in FIG. 11 by arrows 1004, 1006) of the bottom carrier plate 508 and the top carrier plate 504 together around the vertical axis with the top holder 501, the second ring gear 506, and the first ring gear 510 fixed. The input rotations 1104 and 1106 of the bottom carrier plate 508 and the top carrier plate 504 cause the third planetary gears 706, the second planetary gears 704, and the first planetary gears 702 to rotate as sets along with the carrier plates 504, 508. Since the ring gears, to which the planetary gears are coupled, are fixed during this rotation, this causes the first, the second and the third sun-gears 202, 302, 402 to rotate instead. The first sun-gear 202, the second sun-gear 302, and the third sun-gear 402 rotate around the vertical axis causing the output yaw rotation 1102 of the first tubular shaft 204, second tubular shaft 304, and third tubular shaft 404 of the mechanism 100. The output yaw rotation 1102 is in the same rotational direction as the input rotations 1104 and 1106. The combined rotations of the first tubular shaft 204, second tubular shaft 304, and third tubular shaft 404 result in roll, pitch and yaw action. Returning to FIG. 1, control over yaw is achievable where the pitch angle is non-zero. Since the carrier plates 504, 508 are coupled (e.g., via pins) to move together, physical rotational engagement of only one of the plates is sufficient. Thus, rotation of a single input member (e.g., one of carrier plates 504, 508) can result in concurrent or even simultaneous adjustment of roll, pitch and yaw.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems, not necessarily the exemplary document exchange document transformation system generally described above.

For instance, the foregoing detailed description and figures discuss and illustrate the use of gears in various implementations or embodiments of the apparatus. It will be understood by those skilled in the art that one, more, or even all of the gears can be replaced by a pulley and a cable or pulley and a belt in one or more implementations or embodiments. The pulleys can be ceramic pulleys or metal pulleys, depending on the particular application, while the cables may, for example take the form of high tensile cables, for instance high tensile steel cables. Such may advantageously reduce backlash and friction over gear based embodiments.

The various embodiments described above can be combined to provide further embodiments. To the extent that they are not inconsistent with the specific teachings and definitions herein, all of the US patent application publications, US patent applications, U.S. patents, International patent applications, foreign patents, and foreign patent applications referred to in this specification and/or listed in the Application Data Sheet are incorporated herein by reference, in their entirety, including but not limited to: U.S. Provisional Patent Application No. 62/880,783, filed Jul. 31, 2019. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus that provides three degrees-of-freedom (DOF) movement, the apparatus comprising:
    a first input member;
    a second input member;
    a third input member;
    a first tubular shaft, the first tubular shaft rotatable about a first axis;
    a second tubular shaft, the second tubular shaft rotatable about the first axis in response to rotation of the second input member about the first axis;
    a third tubular shaft, the third tubular shaft rotatable about the first axis in response to rotation of the third input member about the first axis;
    a first output member having a first longitudinal axis about which the first output member is rotatable;
    a second output member having a pivot axis about which the second output member is pivotable, the pivot axis perpendicular to the first longitudinal axis, wherein the first output member is rotatably coupled to the second output member and the second output member is coupled to rotate with the third tubular member;
    a plurality of gears, at least two of the gears of the plurality of gears drivingly couple the first tubular shaft to rotate about the first axis in response to rotation of the first input member, at least two of the gears of the plurality of gears drivingly couple the second tubular shaft to rotate about the first axis in response to rotation of the second input member, and at least two of the gears of the plurality of gears drivingly couple the first, the second and the third tubular shaft to rotate about the first axis in response to rotation of the third input member.

2. The apparatus of claim 1 wherein the first tubular shaft, the second tubular shaft and the third tubular shaft each include a respective through passage, and the first tubular shaft, the second tubular shaft and the third tubular shaft are concentrically aligned with one another.

3. The apparatus of claim 2 wherein at least a portion of the first tubular shaft is concentrically rotatably mounted in at least a portion of the through passage of the second tubular shaft, and at least a portion of the second tubular shaft is concentrically rotatably mounted in at least a portion of the through passage of the third tubular shaft.

4. The apparatus of claim 3 wherein the through passage of the third tubular shaft provides a cable or fluid conduit run therethrough.

5. The apparatus of claim 3 wherein the plurality of gears comprises:
    a first gear assembly comprising a first sun gear and a first plurality of planetary gears that drivingly couple the first input member to the first sun gear, the first sun gear fixed to the first tubular shaft; and
    a second gear assembly comprising a second sun gear and a second plurality of planetary gears that drivingly couple the second input member to the second sun gear, the second sun gear fixed to the second tubular shaft; and a third sun gear fixed to the third tubular shaft.

6. The apparatus of claim 5 wherein the first sun gear and the first tubular shaft are a first single piece unitary structure, the second sun gear and the second tubular shaft are a second single piece unitary structure and the third sun gear and the third tubular shaft are a third single piece unitary structure.

7. The apparatus of claim 5 wherein the first gear assembly further comprises a set of combined spur and bevel gears that drivingly couple a first set of gear teeth on the first tubular shaft with a second set of gear teeth on the first output member.

8. The apparatus of claim 7 wherein the second gear assembly further comprises a primary pitch bevel gear on the second tubular shaft located at a first distance from the second sun gear along the first axis, and a secondary pitch bevel gear on the second tubular shaft located at a second distance from the second sun gear along the first axis, the second distance different from the first distance.

9. An apparatus comprising:
a first input member rotatable about a first axis;
a second input member rotatable about the first axis;
a third input member rotatable about the first axis;
a first tubular shaft, the first tubular shaft coupled to rotate about the first axis in response to rotation of the first input member about the first axis;
a second tubular shaft, the second tubular shaft coupled to rotate about the first axis in response to rotation of the second input member about the first axis; and
a third tubular shaft, the first, the second and the third tubular shafts coupled to rotate about the first axis in response to rotation of the third input member about the first axis;
wherein the first tubular shaft, the second tubular shaft and the third tubular shaft each include a respective through passage, at least a portion of the first tubular shaft is concentrically rotatably mounted in at least a portion of the through passage of the second tubular shaft, at least a portion of the second tubular shaft is concentrically rotatably mounted in at least a portion of the through passage of the third tubular shaft, and the through passage of the third tubular shaft provides a cable fluid conduit run therethrough.

10. The apparatus of claim 9, further comprising:
an output structure that includes at least a portion of the third tubular shaft; and
a plurality of gears that transfer rotational motion of the first, the second and the third input members into a roll, a pitch, and a yaw of the output structure, and wherein the plurality of gears includes a set of combined spur and bevel gears that drivingly couple a first set of gear teeth on the first shaft with a second set of gear teeth on a first output member of the output structure as a first joint assembly.

11. The apparatus of claim 10 wherein the plurality of gears includes three sun gears, and rotation of one of the sun gears adjusts a pitch of the output structure, rotation of another one of the sun gears adjust a roll of the output structure, and simultaneous rotation of all of the sun gears adjusts a yaw of the output structure.

12. An apparatus comprising:
a first input member;
a second input member;
a third input member;
a first output member;
a second output member;
a third output member;
a plurality of gears that drivingly couple the first, the second and the third input members to the first, the second and the third output member, wherein the first input member controls only the first output member, the second input member controls only the second output member, and the third input member controls all of the first, the second and the third output members to concurrently rotate together;
a first tubular shaft rotatable about a first axis in response to rotation of the first input member; and
a second tubular shaft rotatable about the first axis in response to rotation of the second input member, wherein the third output member includes a third tubular shaft rotatable about the first axis in response to rotation of the third input member, at least a portion of the first tubular shaft at least partially received within at least a portion of the second tubular shaft for rotation with respect thereto and at least a portion of the second tubular shaft at least partially received within at least a portion of the third tubular shaft for rotation with respect thereto.

* * * * *